United States Patent [19]

Kondo et al.

[11] Patent Number: 4,457,601
[45] Date of Patent: Jul. 3, 1984

[54] CAMERA WITH ELECTRICAL SHUTTER

[75] Inventors: Isao Kondo; Yukio Nakajima, both of Hachioji, Japan

[73] Assignee: Olympus Optical Co. Ltd., Tokyo, Japan

[21] Appl. No.: 401,004

[22] Filed: Jul. 22, 1982

Related U.S. Application Data

[63] Continuation of Ser. No. 47,215, Jun. 11, 1979, abandoned.

[30] Foreign Application Priority Data

Jul. 5, 1978 [JP]  Japan ................................. 53-82324

[51] Int. Cl.³ ..................... G03B 7/083; G03B 15/05
[52] U.S. Cl. .................................... 354/418; 354/420; 315/241 P
[58] Field of Search ................. 354/32, 33, 34, 35, 354/60 F, 127, 128, 139, 145, 149, 50, 51; 315/241 P, 151

[56] References Cited

U.S. PATENT DOCUMENTS

| 3,720,144 | 3/1973 | Uchiyama | 354/34 |
| 3,846,812 | 11/1974 | Biber | 354/145 |
| 3,995,286 | 11/1976 | Tokutomi | 354/33 |
| 3,999,193 | 12/1976 | Hasegawa | 354/33 |
| 4,012,665 | 3/1977 | Nakamura et al. | 354/145 X |
| 4,163,924 | 8/1979 | Hasegawa et al. | 315/241 P |
| 4,199,242 | 4/1980 | Hosomizu et al. | 354/109 X |

FOREIGN PATENT DOCUMENTS

| 2555585 | 6/1976 | Fed. Rep. of Germany | 354/139 |
| 2728527 | 1/1978 | Fed. Rep. of Germany | 354/34 |
| 2746263 | 4/1978 | Fed. Rep. of Germany | 354/34 |

Primary Examiner—William B. Perkey
Attorney, Agent, or Firm—Louis Weinstein

[57] ABSTRACT

A camera with an electrical shutter comprises auxiliary shutter closing means which is responsive to an electrical signal supplied from an electronic flash to operate a photometric circuit of the camera in a normal manner. During a flash photographing operation using an electronic flash, if an amount of light incident on a light receiving element in the photometric circuit is less than a given value, an electrical signal which is supplied by the electronic flash upon occurrence of the flashlight illumination from a flash discharge tube is applied to the auxiliary closing means, thereby forcibly closing the shutter.

15 Claims, 4 Drawing Figures

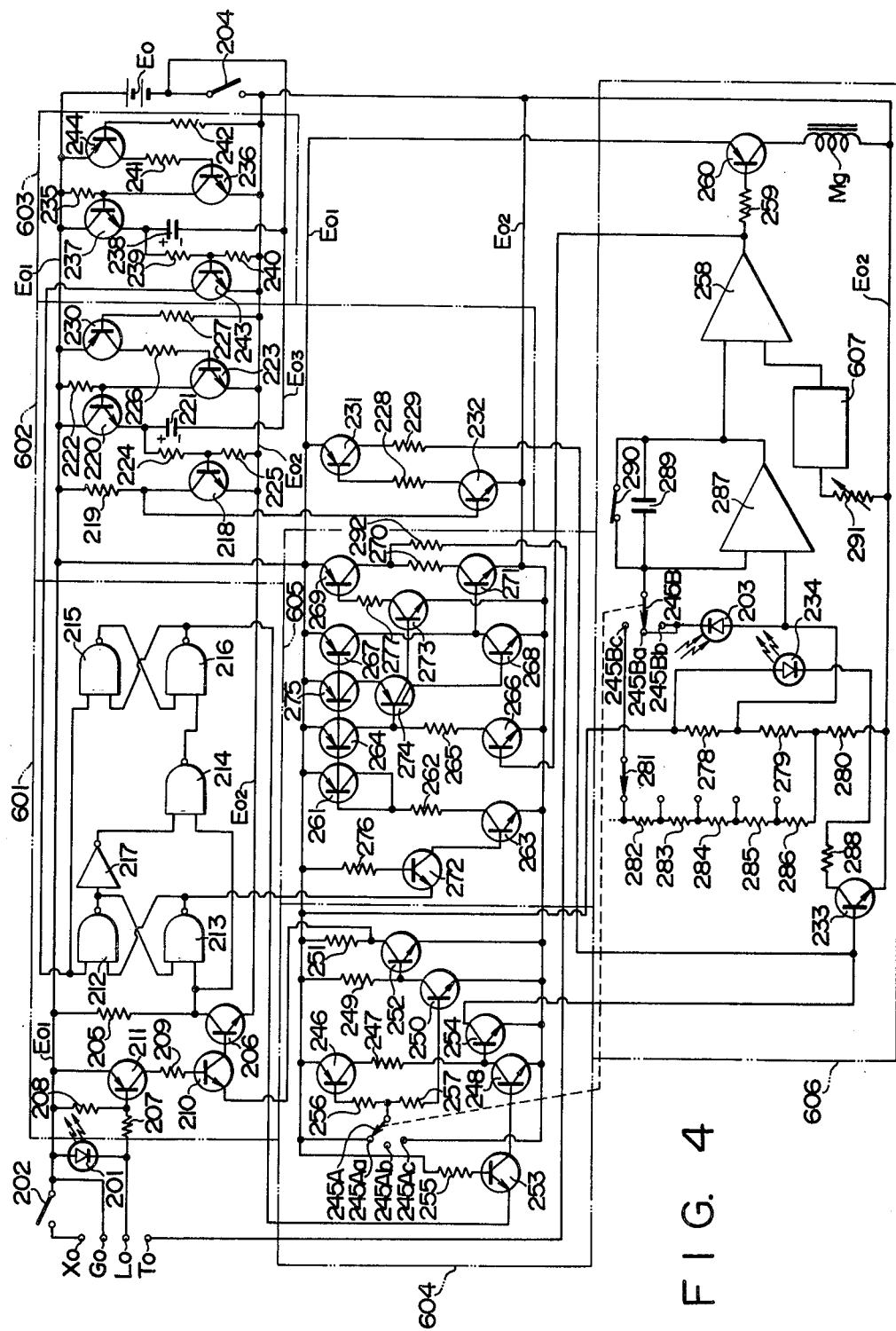
F I G. 4

CAMERA WITH ELECTRICAL SHUTTER

This is a continuation of application Ser. No. 47,215, filed June 11, 1979 now abandoned.

BACKGROUND OF THE INVENTION

The invention relates to a camera with an electrical shutter, and more particularly, to such a camera having an electrical shutter of non-memory, TTL (through the lens) photometry type in which the shutter is forcibly closed under an underexposure condition when an electronic flash is mounted on the camera to take a picture under flashlight illumination.

When an electronic flash is mounted on a camera having an electrical shutter of non-memory, TTL photometry type, there are a number of operating schemes depending on the choice of a particular signal which is used to close the shutter, However, these schemes suffer from various disadvantages.

Specifically, when an exposure period under a flashlight illumination is preset on the camera so that synchro contacts are closed at the termination of the running of a first shutter blind and at the beginning of running of a second shutter blind, it is likely that the shutter will be closed without involving a flashlight illumination from the electronic flash as a result of an insufficient charging of a main capacitor or a user having forgotton to load a power supply, thus resulting in a failure to take a picture.

In an alternative arrangement, a fixed exposure period may be established at the time the electronic flash is mounted on the camera or at the completion of a charging operation of the main capacitor thereof. In this instance, there takes place no detection of a flashlight illumination from the electronic flash, so that the shutter can be closed without an operation of the illumination circuit, again resulting in a failure to take a picture. In addition, because the photometric function provided on the part of the camera is not activated, the exposure is solely controlled by the electronic flash. This may result in an overexposure when an object being photographed is under bright illumination, destroying the vary purpose of a camera of TTL photometry type.

SUMMARY OF THE INVENTION

It is an object of the invention to provide a camera with an electrical shutter of non-memory, TTL photometry type which causes the shutter to be forcibly closed in a flash photography mode within a period which is short enough to prevent a camera shake under an underexposure condition, in response to an illumination signal which is produced upon the occurrence of a flashlight illumination from the electronic flash.

In accordance with the invention, when an electronic flash is mounted on the camera, an illumination signal is produced upon the occurrence of a flashlight illumination from a flash discharge tube. In the event the magnitude of a flashlight illumination from the electronic flash is insufficient to provide a proper exposure upon an object being photographed, the illumination signal forcibly closes the shutter within a period which is short enough to prevent a camera shake. In this manner, it is assured that a photograph can be taken which may be of less than satisfactory quality as a result of an underexposure, but which is free from adverse influences of a camera shake.

BRIEF DESCRIPTION OF THE DRAWINGS

FIG. 4 is a circuit diagram of the electrical circuit of a camera according to another embodiment of the invention.

DESCRIPTION OF PREFERRED EMBODIMENTS

Figure 1:
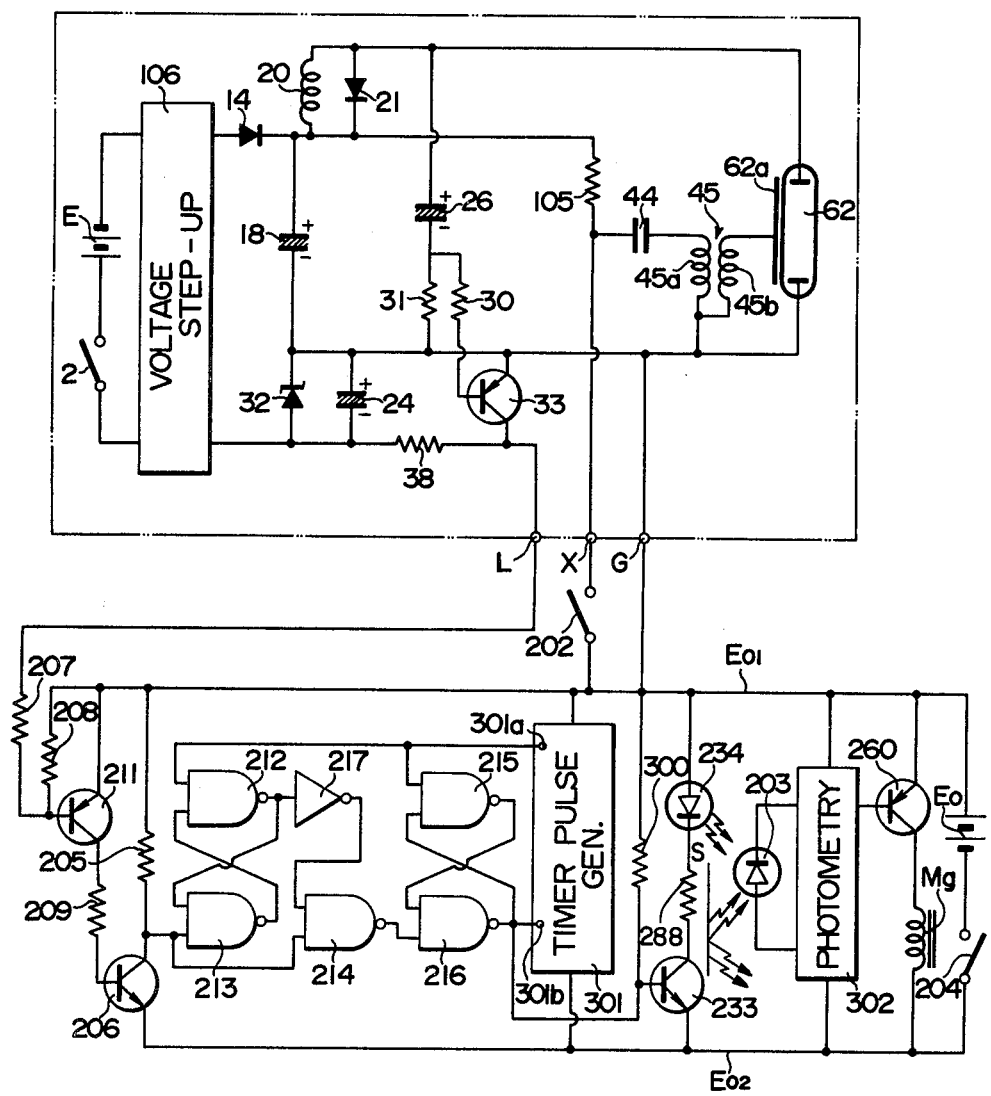
FIG. 1 is a circuit diagram of the electrical circuit of a camera according to one embodiment of the invention, in combination with the electrical circuit of an electronic flash which is mounted thereon.

Referring to FIG. 1, there is shown the electrical circuit of a camera according to one embodiment of the invention, as combined with the electrical circuit of an electronic flash which is mounted thereon. The electrical circuit of the electronic flash is indicated within a block enclosed by phantom line.

The electrical circuit of the electronic flash shown is essentially conventional. It includes a power supply E which is connected in series with power switch 2. The combination of supply E and switch 2 is connected with voltage step-up circuit 106, one output terminal of which is connected with the anode of rectifier diode 14, which functions to rectify a high voltage output from this circuit. The cathode of diode 14 is connected through resistor 105 with connection terminal X which is in turn connected with one of synchro contacts. The other output terminal of voltage step-up circuit 106 is connected through resistor 38 with connection terminal L. Connected across the cathode of diode 14 and the other output terminal of circuit 106 is a series circuit including main capacitor 18, and a parallel combination of Zener diode 32 and capacitor 24, which combination feeds an emitter-to-collector voltage to transistor 33. Main capacitor 18 is shunted by a series path including a parallel combination of coil 20 and diode 21, and main discharge tube 62. Coil 20 is effective to limit the peak current flow to flash discharge tube 62 while diode 21 conducts a counter-electromotive force developed upon the interruption of a flashlight illumination. The junction between the parallel combination and discharge tube 62 is connected through a series combination of capacitor 26 and resistor 31 with the cathode of Zener diode 32. The junction between capacitor 26 and resistor 31 is connected through resistor 30 with the base of PNP transistor 33, which has its emitter connected with a cathode of Zener diode 32 and its collector connected with connection terminal L. Connection terminal X is connected with common ground terminal G through trigger capacitor 44 and primary coil 45a of trigger transformer 45 connected in series. Terminal G is also connected with one end of secondary coil 45b of trigger transformer 45, while its other end is connected with trigger electrode 62a of flash discharge tube 62. Finally, terminal G is also connected with the cathode of Zener diode 32.

The electrical circuit of a camera which is to be connected with the electrical circuit of the electronic flash essentially comprises a current detecting and storing logic circuit, a timer pulse generator and an electrical shutter control circuit. Specifically, the electrical circuit of the camera includes power supply E0 which has its positive terminal connected with positive bus E01 and which has its negative terminal connected with one end of main switch 204, the other end of which is negative bus E02. The logic circuit comprises a series circuit including resistor 205 and NPN transistor 206 connected across the pair of buses, and also includes resistors 207 to 209, transistor 211, NAND circuits 212 to 216 and inverter 217. Specifically, transistor 211 has its base connected through resistor 207 with terminal L and also connected through resistor 208 with bus E01. Transistor 211 has its emitter connected with bus E01 and its collector connected through resistor 209 with the base of transistor 206, which has its emitter connected with bus E02, and its collector connected through resistor 205 with bus E01 and also connected to one input of NAND circuit 213. Together with NAND circuit 212, NAND circuit 213 forms a flipflop, with the output of NAND circuit 213 fed back to one input of NAND circuit 212. The output of NAND circuit 212 is fed back to the other input of NAND circuit 213, and is also connected with the input of inverter 217. The output of inverter 217 is connected with one input of NAND circuit 214, the other input of which is connected with the collector of transistor 206. The output of NAND circuit 214 is connected with one input of NAND circuit 216, which receives its other input from the output of NAND circuit 215. The output of NAND circuit 216 is fed back to one input of NAND circuit 215 and is also connected with the base of switching transistor 233 contained in an electrical shutter control circuit to be described later. The other input of NAND circuit 215 is connected with the other input of NAND circuit 212, to which a reset pulse signal from timer pulse generator 301, to be described later, is applied.

Timer pulse generator 301 is connected across the pair of buses E01, E02 and has a pair of output terminals 301a, 301b. Output terminal 301a is connected with one input of NAND circuits 212, 215, and supplies a reset pulse of a lower potential than the ground potential, as indicated in FIG. 2(E), for a time interval of 1 ms, for example, in response to the closure of main switch 204. Because the reset pulse has a potential which is lower than the ground potential, its logical level is referred to herein as binary "0" in contrast to the ground potential which is referred to as binary 1.

Output terminal 301b is connected with the base of switching transistor 233 in the shutter control circuit, and supplies thereto a limiter signal having a lower potential than the ground potential as shown in FIG. 2(F) for a time interval of 60 ms, for example, in response to the closure of main switch 204. This limiter signal also represents binary 0.

The electrical shutter control circuit above referred to comprises a series circuit connected across buses E01, E02 and including light emitting element 234 as may be formed by a light emitting diode, for example, which is located adjacent to photometric light receiving element 203, resistor 288 and NPN switching transistor 233. Additionally, it comprises photometric circuit 302, and another series circuit including PNP switching transistor 260 and shutter closing electromagnet Mg, both connected across the pair of buses E01, E02. Transistor 233 has its collector connected with one end of resistor 288, its emitter connected with bus E02 and its base connected with the output of NAND circuit 216 and output terminal 301b of timer pulse generator 301 and also connected through resistor 300 with bus E01. Photometric, light receiving element 203 has a rapid response to light, and may be formed by a silicon blue cell, for example. It is connected across a pair of input terminals of photometric circuit 302. Transistor 260 has its emitter connected with bus E01, and its collector connected with one end of electromagnet Mg, the other end of which is connected with bus E02. The base of transistor 260 is connected with photometric circuit 302 so that an output of photometric circuit which is supplied to the base of transistor 260 is interrupted when photometric element 203 has received a given amount of light, thus turning transistor 260 off to deenergize electromagnet Mg, which then allows a second shutter blind to run to thereby close the shutter. It will be noted that synchro switch 202 is connected between bus E01 and connection terminal X.

Figure 2:
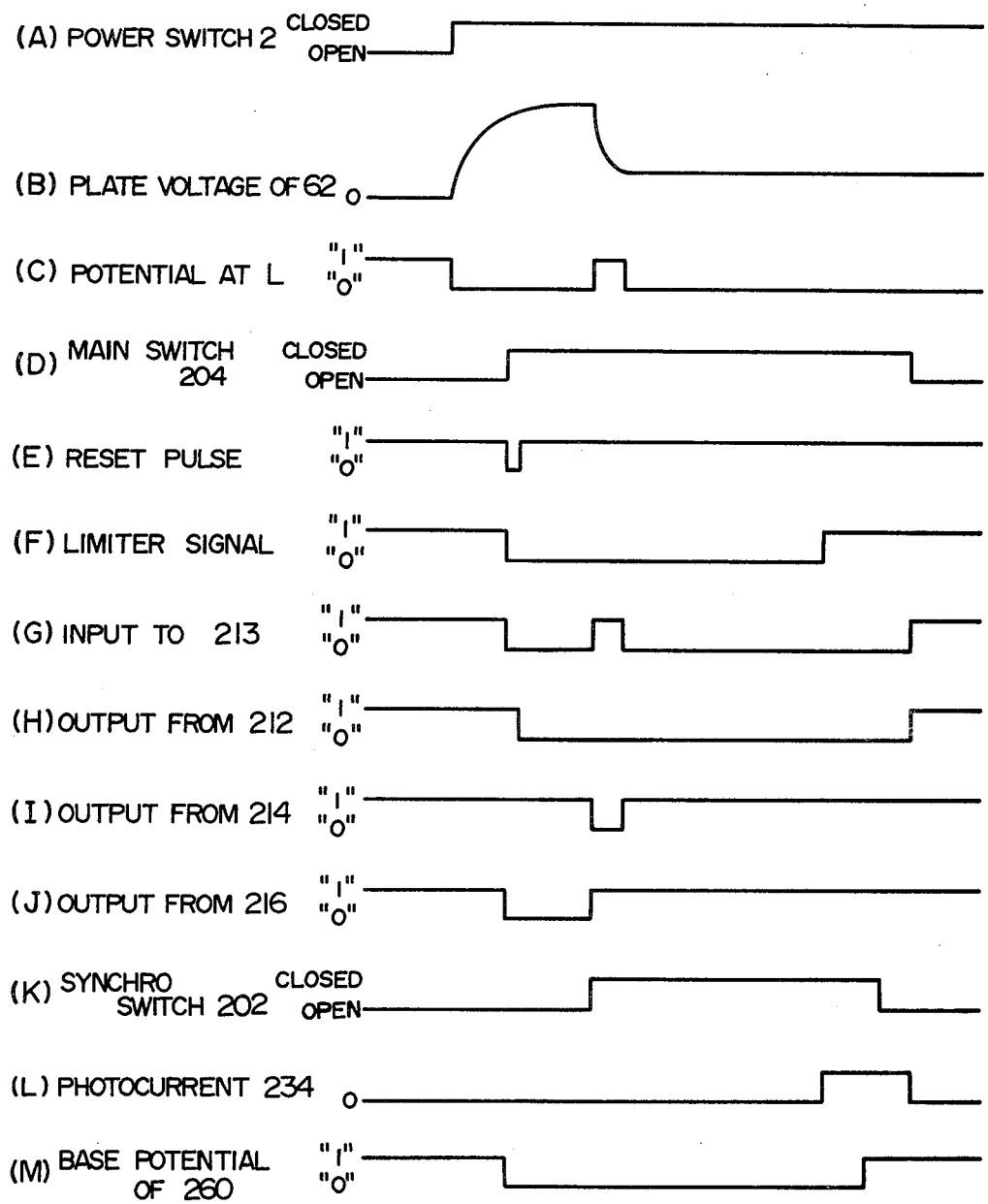
FIG. 2 graphically shows various voltages appearing at various points in the electrical circuit shown in FIG. 1.

The operation of the combination of the camera and the electronic flash described above will now be explained with reference to a series of graphs shown in FIG. 2. FIG. 2(A) shows a bi-level curve, the upper level indicating the closure of power switch 2. The voltage of power supply E is then stepped up by voltage step-up circuit 106, and the stepped up voltage is rectified by diode 14 to charge main capacitor 18, trigger capacitor 44 and other capacitors 24 and 26, enabling the electronic flash for a flashlight emitting operation. At this time, the potential at the anode of flash discharge tube 62 approaches its saturation as indicated in FIG. 2(B) while the potential at connection terminal L assumes binary 0, as indicated in FIG. 2(C).

When main switch 204 is then closed (see FIG. 2(D)) in response to the depression of a shutter button, the electrical circuit of the camera is fed from the power supply, whereby photometric circuit 302 produces an output, shown in FIG. 2(M), which is supplied to the base of transistor 260, thus turning this transistor on to energize electromagnet Mg which then holds the second shutter blind against running. At the same time, a reset pulse shown in FIG. 2(E) having a duration such as 1 ms which is short as compared with an operating period of the camera is produced at terminal 301a of timer pulse generator 301, and is supplied to NAND circuits 212, 215 in the logic circuit.

In response to the reset pulse, binary 0 is applied to one input of NAND circuit 212, which produces at its output binary 1 shown in FIG. 2(H). This output is fed back to one input of NAND circuit 213. Because the potential at connection terminal L is now at the level of binary 0 as shown in FIG. 2(C), transistor 211 is turned on as is transistor 206, supplying binary 0, shown in FIG. 2(G), to the other input of NAND circuit 213, which then produces binary 1 output. Then inverter 217 produces binary 0 output while NAND circuits 214 and 216 produce binary 1 and binary 0 outputs, as shown in FIGS. 2(I) and (F), respectively, thereby turning transistor 233 off independently from the presence or absence of a limiter signal. Consequently, element 234 produces no light output under this condition.

Subsequently when the reset pulse is removed, binary 1 is supplied to one input each of NAND circuits 212 and 215, so that the output of NAND circuit 212 changes to binary 0, as indicated in FIG. 2(H), producing binary 1 at the output of inverter 217. The output of other NAND circuits remains unchanged. Then the logic circuit maintains a stored indication in the form of binary 0 output from NAND circuit 212 that the potential at connection terminal L assumes the level of binary 0, or that the electronic flash is in operation.

When the first shutter blind of the camera S (FIG. 1) has terminated its run, synchro switch 202 is closed in synchronized relationship therewith, as shown in FIG. 2(K), so that flash discharge tube 62 will initiate a flashlight illumination, provided main capacitor 18 is sufficiently charged to a voltage which exceeds a discharge initiation voltage level of this tube. A flow of discharge current through tube 62 causes the anode potential thereof to be reduced rapidly as indicated in FIG. 2(B), and the charge on capacitor 26 discharges through a path including tube 62, the emitter-to-base path of transistor 33 and resistor 30, thus turning transistor 33 on to short-circuit connection terminals L and G. Then, the potential at this terminal L rises to the level of binary 1, as indicated in FIG. 2(C), turning transistors 211, 206 off, whereby binary 1 is supplied to one input of NAND circuits 213 and 214, as indicated in FIG. 2(G). This causes no change in the output of NAND circuits 212, 213 and inverter 217, but the output of NAND circuits 214, 215, 216 change to the levels of binary 0, binary 0 and binary 1, respectively, as indicated in FIGS. 2(I) and (J). This enables transistor 233 to be turned on as soon as the limiter signal ceases to be supplied. In the logic circuit, a change of the output of NAND circuit 216 to binary 1 represents a stored indication that connection terminal L has once assumed the level of binary 1 or the fact that the electronic flash has emitted a flashlight illumination. As a consequence, there occurs no change in the output of NAND circuit 216 regardless of any potential change at connection terminal L unless main switch 204 is closed again to supply another reset pulse.

The length of time during which the limiter signal is produced is chosen to be longer than the time during which synchro switch 202 is maintained closed, so that when the electronic flash has emitted a flashlight illumination, a change of the limiter signal from timer pulse generator 301 to the level binary 1 as shown in FIG. 2(F) after the output of NAND circuit 216 has changed to binary 1 will permit transistor 233 to be turned on, passing a current flow through element 234 to cause its light emission as indicated in FIG. 2(L). Element 234 is disposed adjacent to photometric element 203 so as to cause a photocurrent of an increased magnitude to be produced therein even if the amount of light emitted by element 234 is at low level. Therefore, when element 234 emits light, the amount of light incident on photometric element 203 will reach a given value within a very brief period of time on the order of several milliseconds, thereby causing photometric circuit 302 to cease to produce its output supplied to the base of transistor 260, as indicated in FIG. 2(M). Transistor 260 is turned off to deenergize electomagnet Mg, which then allows the second shutter blind to run, thus closing the shutter. The limiter signal is produced with a timing such that it terminates later than the closure of the synchro contacts and to provide an exposure period which prevents a camera shake from occurring during a usual photographing operation. This enables a photograph to be obtained which is free from the influences of a camera shake in the event of an insufficient light output from the electronic flash. It will be appreciated that because the electronic flash has emitted a flashlight illumination, the illumination level of an object being photographed will have reached a certain level, through it may be less than a proper exposure level, so that a better result will be obtained by closing the shutter at such timing to provide a photograph which is free from the influences of a camera shake than allowing the shutter to remain open.

It will be understood that if a proper exposure is reached before the time interval determined by the limiter signal passes, the shutter will be instantly closed to open main switch 204, whereby element 234 is no longer fed to continue its emission of light.

If the electronic flash is not mounted on the camera, or if power switch 2 is not closed though the electronic flash is mounted on the camera, the potential at connection terminal L stays at binary 1, supplying binary 1 to one input of NAND circuit 213. This causes no change in the output of NAND circuit 216 from binary 0, so that transistor 233 remains off regardless of the presence or absence of the limiter signal, preventing element 234 from producing light output. Consequently, a usual photographing operation takes place under natural light.

In the event the voltage to which main capacitor 18 is charged is less than the discharge initiation voltage of flash discharge tube 62 though the electronic flash is mounted on camera and power switch 2 is closed, the closure of synchro switch 202 causes no discharge of discharge tube 62. Hence transistor 33 cannot be turned on, and thus connection terminals L and G are not short-circuited together, whereby transistors 211, 206 remain on. Because binary 1 is not supplied to NAND circuit 213, the output of NAND circuit 216 does not change from binary 0. Consequently, transistor 233 remains off regardless of the presence or absence of the limiter signal, preventing element 234 from producing light output. A usual photographing operation under natural light then results.

From the foregoing description, it will be understood that with the camera of the invention, a photgraph which is free from the influences of a camera shake can be obtained under an underexposure condition when TTL photometric, light receiving element receives an amount of light from an object being photographed which is less than a given value, by casuing the shutter to be closed within an exposure period which is short enough to prevent a camera shake, in response to an illumination signal from the electronic flash.

Figure 3:
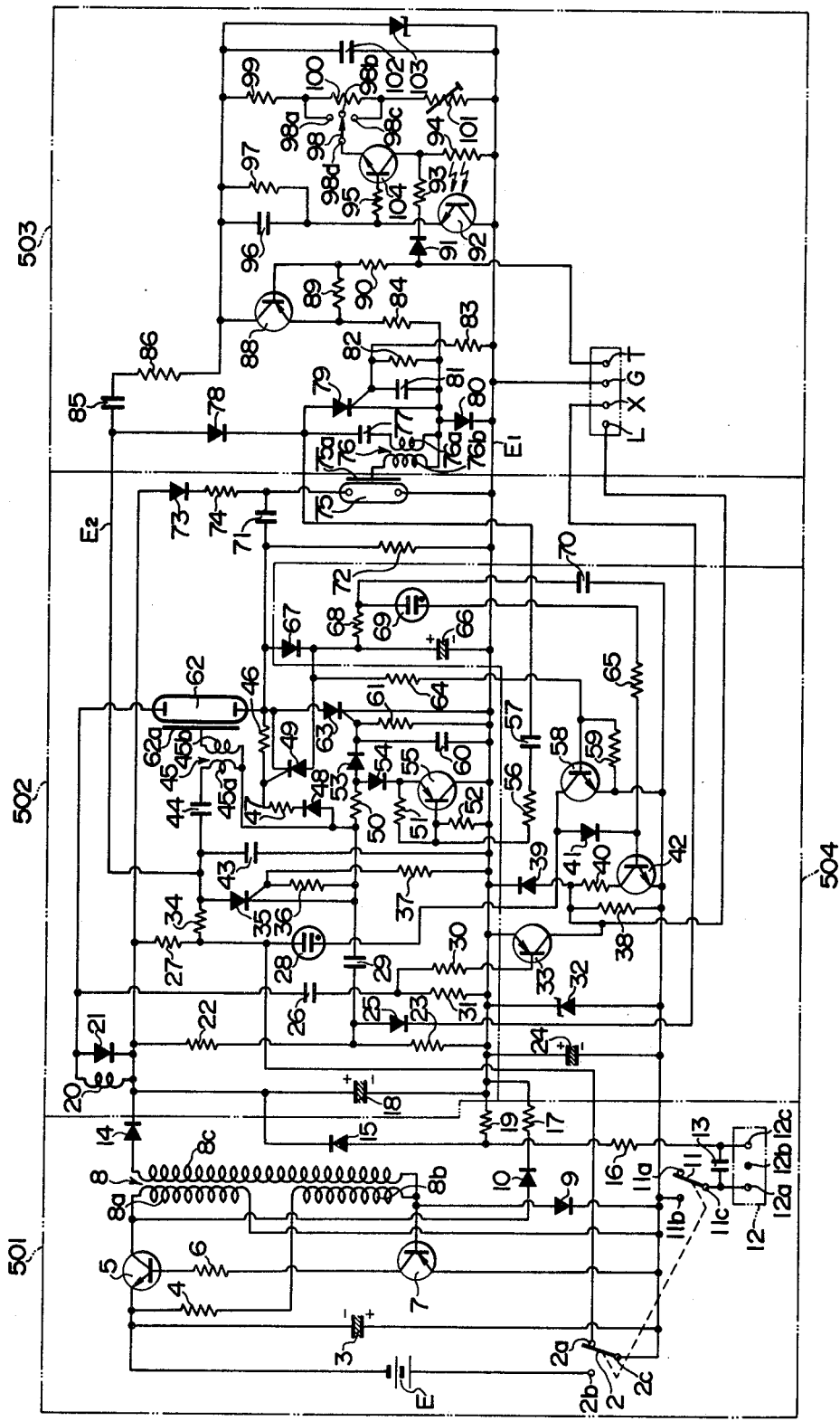
FIG. 3 is a circuit diagram of an electronic flash having the capability of an automatic illumination control and which can be mounted on the camera of the invention.

FIGS. 3 and 4 show a second embodiment of the invention. FIG. 3 shows an electrical circuit of an electronic flash which may be mounted on the camera of this embodiment of the invention. The electrical circuit shown generally comprises power supply circuit 501, flashlight illumination circuit 402, illumination control circuit 503, display circuit 504, and four connection terminals L, X, G, T which are adapted to be connected with corresponding connection terminals LO, XO, GO, TO provided in the electrical circuit of a camera which will be described later in connection with FIG. 4.

Collection terminal L is used to transmit a display signal indicative of the completion of a charging operation, the completion of a flashlight illumination or the occurrence of flashlight illumination to the camera from display circuit 504. Connection terminal X is connected with synchro contacts of the camera while connection terminal G represents a common ground terminal. The electronic flash is activated for flashlight illumination as synchro switch 202 (see FIG. 4) provided on the part of camera is closed in synchronized relationship with the opening of the shutter. Connection terminal T is used to transmit an external control signal or an illumination control signal to the illumination control circuit 503 from the camera.

Specifically considering the various parts of the electrical circuit, power supply circuit 501 functions to step up the voltage of power supply E for feeding the various circuit of the electronic flash. Thus, it comprises a DC-DC converter of a known form. More specifically, positive terminal of supply E is connected with fixed contact 2b of power switch 2, the movable contact 2c of which is connected with one end of supply auxiliary capacitor 3, the other end of which is returned to the negative terminal of supply E. A series circuit including resistor 4, feedback coil 8b of step-up oscillator transformer 8, and diode 9, which protects transistor 7 from a counter-electromotive force developed during the oscillation, is connected in shunt with capacitor 3. Another series circuit including the emitter-to-collector path of switching power transistor 5 of NPN type and input coil 8a of transformer 8 is also connected in shunt with capacitor 3. Transistor 5 has its emitter connected with the negative terminal of power supply E, its base connected with the collector of converter transistor 7 of PNP type through resistor 6, and its collector connected with one end of input coil 8a and also connected with negative bus E1 through a series combination of diode 19 and resistor 17. Transistor 7 has its emitter connected with contact 2c of switch 2, and its base connected with the junction between feedback coil 8b and diode 9. Connected with this junction is one end of secondary oil 8c of transformer 8, the other end of which is connected with the anode of rectifier diode 14. There is also provided external power switch 11 which is ganged with power switch 2, and which includes fixed contact 11b connected with contact 2c of power switch 2, and transfer contact 11c that is connected with the terminal 12a of terminal box 12 for connection with an external power supply which may be connected with the electronic flash and that is also connected with one end of capacitor 13, the other end of which is connected with terminal 12c of terminal box 12 and also connected with the cathode of rectifier diode 14 through a series combination of resistor 16 and diode 15. The anode of diode 15 is connected through resistor 19 with negative bus E1 to which connection terminal G is also connected. Power switch 2 also includes fixed contact 2a which is connected with the junction between resistor 27 and light emitting element 28 contained in the flashlight illumination circuit 102 and which functions to indicate the completion of a charging operation.

When the power switch 2 is switched from fixed contact 2a to fixed contact 2b, a base current is supplied to transistor 7 through feedback coil 8b and resistor 4, whereby an amplified collector current is fed to the base of transistor 5, which in turn produces an amplified collector current flowing through input coil 8a and contacts 2b, 2c. The voltage that is developed across input coil 8a as a result of such current flow is stepped up according to the turn ratio of secondary coil 8c to input coil 8a, inducing a high voltage across secondary coil 8c. A stepped up voltage is also developed across feedback coil 8b to cause a further increase in the current flow. The positive feedback through feedback coil 8b drives transistor 5 to its saturation through transistor 7. When the current reaches its saturation, the feedback from input coil 8a to feedback coil 8b is interrupted, which causes a decrease in the base current of transistor 7, thus reducing the current flow through both transistors 5, 7. As a result, transistor 5 is rendered non-conductive instantaneously. Then the energy stored in input coil 8a produces a counter-electromotive force, inducing a damped oscillation which is determined by the inductance of the coil and the distributed capacitance. A component of the damped oscillation is coupled to feedback coil 8b in a direction to increase a base current to transistor 7, and this permits transistor 7 to conduct a collector current, which then is effective to cause a flow of collector current through transistor 5. Coils 8a, 8b function to cause a rapid increase of these collector currents. This process is repeated to develop a high voltage across secondary coil 8c, which is rectified by diode 14 to supply an operating voltage on positive bus E2, which feeds various circuits of the electronic flash.

The flashlight illumination circuit 502 includes flash discharge tube 62 and SCR 63 as well as a series-controlled, automatic illumination control circuit which includes commutating capacitor 71 and auxiliary discharge tube 75. A semiconductor switch trigger circuit is used which drives trigger capacitor 44 through SCR 35. More specifically, flashlight illumination circuit 502 includes main capacitor 18, a voltage divider formed by a series combination of resistors 22, 23, a series path including a parallel combination of coil 20 which limits the peak current flow through discharge tube 62 and SCR 63, and diode 21 which is adapted to conduct a counter-electromotive force developed across trigger transformer 45 upon interruption of the flashlight illumination, the parallel combination being connected in series with a series combination of flash discharge tube 62 and main switching element formed by SCR 63, and another series circuit including diode 73, resistor 74 and auxiliary discharge tube 75, all connected between the cathode of rectifier diode 14 and negative bus E1. Also connected with the cathode of rectifier diode 14 is one end of resistor 27, the other end of which is connected with one end of display element 28, the other end of which is connected with the collector of transistor 58 contained in display circuit 504. Display element 28 is operable to indicate the completion of a charging operation. The anode of flash discharge tube 62 is also connected with bus E1 through a series combination of capacitor 26 and resistor 31, with the junction therebetween being connected through resistor 30 with the base of transistor 33, also contained in display circuit 504.

The junction between resistor 27 and display element 28 is connected through a series combination of resistor 34 and trigger capacitor 44 with one end of primary coil 45a of trigger transformer 45, the other end of the coil being connected with the cathode of trigger switch, formed by SCR 35. The cathode of this SCR is also connected with one end of secondary coil 45b of trigger transformer 45, with the other end of the coil connected with trigger electrode 62a of flash discharge tube 62.

The junction between resistors 22, 23 is connected through diode 25 with the terminal X which is adapted to be connected with synchro contacts, and is also connected through a series combination of capacitor 29 and resistor 36 with the gate of SCR 35, with the junction therebetween being connected with the cathode of this SCR and also connected through a series combination of resistor 50 and diode 53 with the gate of SCR 63. The gate of SCR 63 is also connected with bus E1 through a parallel combination of capacitor 60 and resistor 61, and its cathode is directly connected with bus E1. The anode of SCR 63 is connected with the cathode of flash discharge tube 62, and also connected through commutating capacitor 71 with the junction between resistor 74 and auxiliary discharge tube 75, and also connected through resistor 72 with bus E1. SCR 49 has its cathode connected with the anode of SCR 63, its gate connected with the junction between resistors 46, 47 which are connected in series with diode 48 between the junction between discharge tube 62 and SCR 63 and the junction between capacitor 29 and resistor 36, and its anode connected with the cathode of diode 67 which is contained in display circuit 504.

SCR 35, which constitutes the trigger switch, has its anode connected with the junction between resistor 34 and trigger capacitor 44, and its cathode connected with the junction between capacitor 29 and resistor 36 and also with the anode of SCR 63 through the series path formed by components 46 to 48. As mentioned previously, its gate is connected through resistor 36 with the junction between capacitor 29 and resistor 50, and is also connected through resistor 37 with bus E1. The junction between resistor 34 and trigger capacitor 44 is connected with bus E1 through capacitor 43, which is utilized to fire SCR 63, and is also connected with diode 78 and capacitor 85, both contained in illumination control circuit 503.

The junction between resistor 50 and diode 53 or the anode of the latter is connected with bus E1 through diode 54 and PNP transistor 55. This transistor has its emitter connected with the cathode of diode 54 and also connected through resistor 51 with its base, which in turn is connected with bus E1 through resistor 52 and is also connected with the anode of SCR 79, contained in illumination control circuit 503, through a series combination of resistor 56 and capacitor 57. The collector of transistor 55 is directly connected with bus E1.

In operation, flashlight illumination circuit 502 functions as follows: the voltage divider formed by resistors 22, 23 develops a voltage at their junction which is effective to charge capacitor 29. When synchro switch 202 (to be described later) is closed on the part of the camera to connect terminal X with the common ground terminal G, a path is completed through diode 25, resistor 37, and a parallel combination of the gate-to-cathode path of SCR 35 and resistor 36 to cause a discharge of capacitor 29, thus producing a gate drive signal to SCR 35.

When SCR 35 is fired, trigger capacitor 43 is effective to drive SCR 63 through a series path including SCR 35, resistor 50, diode 53, and a parallel combination of the gate-to-cathode path of SCR 63, capacitor 60 and resistor 61. The timing for this drive is chosen to be coincident with the time when a trigger signal is applied to trigger electrode 62a of flash discharge tube 62 as a result of the discharge of capacitor 44 through trigger transformer 45.

The circuit portion comprising transistor 55, diode 54, resistors 51, 52, 56 and capacitor 57 represents an auxiliary circuit which prevents a re-firing of SCR 63 in response to noise signals which may be applied to the gate of SCR 63 when SCR 79 is subsequently fired by a signal from illumination control circuit 503 to discharge auxiliary discharge tube 75.

The purpose of illumination control circuit is to interrupt the flashlight illumination from flash discharge tube 62 by causing auxiliary discharge tube 75 to discharge in response to an illumination control signal which is produced when photometric element 203 (see FIG. 4) has received a given amount of light as reflected by an object being photographed which is under flashlight illumination from flash discharge tube 62. However, when a manual photographing mode of the camera is established, light receiving element 92 which is disposed with the electronic flash is activated to determine an exposure period.

Specifically, an operating voltage is fed from flashlight illumination circuit 502. A series circuit including diode 78, trigger capacitor 77, primary coil 76a of trigger transformer 76 and diode 80 is connected in series between the anode of SCR 35 and bus E1. Also, a series circuit including capacitor 85, resistor 86 and Zener diode 103 is connected in shunt with first mentioned series circuit. Transformer 76 has secondary coil 76b which has its one end connected with the trigger electrode 75a of auxiliary discharge tube 75 contained in flashlight illumination circuit 502 and its other end connected with the anode of diode 80. The series combination of capacitor 77 and coil 76 is shunted by a trigger switch, formed by SCR 79, having its gate connected with its cathode through a parallel combination of capacitor 81 and resistor 82 and also connected with bus E1 through resistor 83.

Connected in shunt with Zener diode 103 are capacitor 102; a series circuit including resistors 99, 100 and semi-fixed resistor 101; and another series circuit including a parallel combination of capacitor 96 and resistor 97 and light receiving element 92.

A series circuit including the collector-to-emitter path of PNP transistor 88 and resistor 84 is connected between the anode of Zener diode 103 and the anode of diode 80. Transistor 88 has its collector connected with the anode of Zener diode 103, and its emitter connected through resistor 89 with its base, which is connected with external control signal terminal T through resistor 90. The terminal T is connected with the collector of NPN transistor 104 through diode 91 and resistor 93 connected in series. Transistor 104 has its collector connected with bus E1 through resistor 94, its emitter connected with transfer contact 98d of diaphragm value presetting, changeover switch 98, and its base connected with the emitter of light receiving element 92 through resistor 95. Switch 98 has fixed contact 98a which is connected with the junction between resistors 99, 100, and also includes another fixed contact 98b which is left without connection with the circuit, and further fixed contact 98c which is connected with the junction between resistor 100 and semi-fixed resistor 101. By changing the resistance which is connected with switch 98, the threshold level of photocurrent detecting transistor 104 can be brought into coincidence with a selected diaphragm value of the camera on which the electronic flash is mounted.

In the illumination control circuit 503 thus constructed, transistor 88 is turned on in response to the conduction of photocurrent detecting transistor 104 or a control signal from the camera which is supplied through connection terminal T. The conduction of transistor 88 causes SCR 79 to be fired, which then result in shortcircuiting capacitor 77 through the primary coil 76a of transformer 76, thus applying a high voltage to the trigger electrode of the auxiliary discharge tube 75 for firing. The discharge of the auxiliary discharge tube interrupts the illumination from the flash discharge tube, by biasing the anode of SCR 63 negative through capacitor 71 to render it non-conductive. It is to be understood that Zener diode 103 and capacitor 102 constitute together a constant voltage circuit which is charged to a given voltage by a discharge current from the flash discharge tube flowing through a path including capacitor 85 and and resistor 86 only during the time the trigger thyristor or SCR 35 is conducting. The charge on capacitor 102 is discharged by a path including resistors 99, 100 and 101 after a given time interval, thus preventing the element 92 from responding to radiation other than the flashlight illumination emitted by the flash discharge tube.

Delay circuit 504 is operable to indicate the completion of a charging operation of main capacitor 18 or the completion of a flashlight illumination in response to signals fed from circuits 502 and 503. In addition, this circuit is connected with an electrical circuit which is internally contained in the camera of FIG. 4 through connection terminal L to feed such signals to the camera.

Specifically, Zener diode 32 has its cathode connected with bus E1 and its anode connected with transfer contact 2c of power switch 2. Capacitor 24 is connected in shunt with this Zener diode. A series circuit including PNP transistor 33 and resistor 38 and another series circuit including diode 39, resistor 40 and NPN switching transistor 42 are connected in parallel with capacitor 24. Transistor 33 has its emitter directly connected with bus E1, its collector connected with connection terminal L and its base connected through resistor 30 with the junction between capacitor 26 and resistor 31 in the flashlight illumination circuit so that it may be rendered conductive when capacitor 26 is short-circuited by the discharge of flash discharge tube 62. The transistor 42 has its collector connected with one end of resistor 40, the other end of which is connected with the anode of diode 39 which has its cathode connected with bus being connected with connection terminal L and also with the anode of Zener diode 32 through resistor 38.

The display element 28 has its one end connected with the collector of NPN transistor 58 which is also connected with the base of transistor 42 through diode 41. Transistor 58 has its emitter connected with the anode of diode 32, and its base connected with its emitter through resistor 59 and also connected through resistor 64 with the cathode of diode 67 and the anode of SCR 49 in flashlight illumination circuit 502. Diode 67 has its anode connected with the anode of SCR 63 and its cathode connected with bus E1 through capacitor 66 and also connected through resistor 68 with another display element 69 which is operable to indicate the completion of a flashlight illumination. The junction between resistor 68 and element 69 is connected through capacitor 70 with the anode of Zener diode 32.

In operation, when dispaly element 28 is illuminated to indicate the completion of a charging operation, its current flow is fed through diode 41 to forwardly bias switching transistor 42, which is hence turned on. In this manner, display element 201 (see FIG. 4) which is disposed within the camera is energized for illumination through the electrical connection between connection terminal L and corresponding connection terminal LO provided on the part of the camera. Alternatively, when display element 69 which indicates the completion of a flashlight illumination flashes, the flashing current is similarly supplied to the base of the transistor 42 to cause a flashing operation of display element 201 disposed within the camera. Furthermore, when flash discharge tube 62 discharges to produce flashlight illumination, transistor 33 is turned on, similarly causing an illumination of display element 201. When indicating the completion of a flashlight illumination, transistor 58 is turned on by the voltage across capacitor 66 which is applied thereto through resistors 64, 59, thus bypassing any current flow from display element 28 for a given time interval, thus assuring that only the flashing current from display element 69 passes through transistor 42.

FIG. 4 shows an electrical circuit that is contained within the camera and that is adapted to be electrically connected with the described electrical circuit of the electronic flash. As shown, the electrical circuit of FIG. 3 includes connection terminals LO, XO, GO, TO which correspond to the connection terminals L, X, G, T provided in the electrical circuit of the electronic flash shown in FIG. 3. It generally comprises logic circuit 601 which detects and stores any current flow through display element 201, limiter circuit 602, reset circuit 603, photographing mode switching circuit 604, gate circuit 605 and usual shutter control circuit 606.

Connection terminal LO represents a terminal through which a signal to be displayed is transmitted. Connection terminal XI is associated with synchro contacts, and synchro switch 202 is connected across this terminal and common ground terminal GO. Synchro switch 202 is closed in timed relationship with the opening of the shutter to trigger a flashlight illumination from the electronic flash. Connection terminal TO conveys a control signal from gate combination of power supply EO and main switch 204. One end of resistor 207 is connected with the terminal LO, and its other end is connected with the base of PNP transistor 211. Resistor 208 is connected between the base and bus EO1. Transistor 211 has its emitter connected with bus EO1 and its collector connected through resistor 209 with the base of NPN transistor 210. The emitter of transistor 210 provides an output to photographing mode switching circuit 604. The collector of transistor 210 is connected with the base of NPN transistor 206, which has its emitter connected with bus EO2 and its collector connected through resistor 204 with bus EO1 and also connected with one input of NAND circuit 213. Together with NAND circuit 212, NAND circuit 213 constitutes a flipflop, with the output of NAND circuit 213 being fed back to one input of NAND circuit 212 and also providing an output to gate circuit 605, as will be further described later. The output of NAND circuit 212 is fed back to the other input of NAND circuit 213, and is also fed to the input of inverter 217. the output of inverter 217 is fed to one input of NAND circuit 214, the other input of which is connected with the collector of transistor 206. The output of NAND circuit 214 is fed to one input of NAND circuit 216, the other input of which is connected with the output of NAND circuit 215, with the output of NAND circuit 216 being fed back to one input of NAND circuit 215 and also providing an output to photographing mode switching circuit 604. The other input of NAND circuit 215 is connected with the other input of NAND circuit 212, to which a reset pulse signal is applied from reset circuit 603, as will be further described later.

The purpose of limiter circuit 602 is to cause a termination, at a given time, for example, when 1/60 second has passed representing the limiting time interval during which a camera shake may be avoided, of a prolonged exposure which may be caused when the flashlight illumination emitted by the electronic flash is insufficient to provide a proper exposure of an object being photographed. It may comprise a kind of RC timer having a time constant of 60 ms, for example, which starts with the closure of main switch 204. It comprises five series circuits connected across the pair of buses EO1, EO2, first one including resistor 219 and NPN transistor 218, second one including NPN transistor 220 and capacitor 221, third one including resistor 222 and NPN transistor 223, fourth one including NPN transistor 230 and resistor 227, and fifth one including NPN transistor 231, resistor 228 and NPN transistor 232.

Specifically, transistor 218 has its collector connected with the base of transistor 232, which has its collector connected through resistor 228 with the base of transistor 231 and which has its emitter connected with bus EO2 together with the emitter of transistor 218. Transistor 231 has its emitter connected with bus EO1 and its collector connected to produce an output signal through resistor 229. This output signal is fed to the base of NPN transistor 233 contained in shutter control circuit 606. Time constant capacitor 221 is shunted by a series combination of time constant resistors 224, 225, with the resulting time constant circuit having a time delay of 60 ms, for example. When this delay time has passed, an output signal is produced from the collector of transistor 231 and is applied through resistor 229 to the base of transistor 233 to turn it on when photographing mode switching circuit 604 assumes a condition to permit the connection of limiter circuit 602, thus causing an illumination of display element 234 which is disposed adjacent to photometric element 203 contained in the shutter control circuit 606, the resulting irradiation of element 203 activating shutter control circuit 606 to achieve a forced shutter closing operation.

The junction between resistors 224, 225 is connected with the base of transistor 218 while the base of transistor 220 is connected with the collector of transistor 223. The base of transistor 223 is connected through resistor 226 with the collector of transistor 230, the base of which is connected through resistor 227 with bus EO2. Capacitor 221 has its one end connected with the emitter of transistor 220 and its other end connected through line EO3 with the negative terminal of power supply EO. Consequently, capacitor 221 is maintained charged through transistor 220 independently from the condition of main switch 204.

Reset circuit 603 functions to produce a reset signal which is applied to logic circuit 601, and is substantially similarly constructed as limiter 602. It comprises three series circuits connected across the pair of buses EO1, EO2, first one including resistor 235 and NPN transistor 236, second one including NPN transistor 237 and capacitor 238, and third one including the emitter-to-base path of NPN transistor 244 and resistor 242. A series combination of resistors 239, 240 are connected between the emitter of transistor 237 and bus EO2, with their junction connected with the base of NPN output transistor 243, which has its collector connected with the other input of NAND circuit 212 and which has its emitter connected with bus EO2. Transistor 244 has its emitter connected with bus EO1 and its collector connected through resistor 241 with the base of transistor 236, which has its emitter connected with bus EO2 and its collector connected with the base of transistor 237, which is in turn connected with bus EO1 through resistor 235. The collector of transistor 237 is connected with bus EO1. Capacitor 238 has its one end connected with the emitter of transistor 237 and its other end directly connected with line EO3, and forms part of a time constant circuit, which also includes resistors 239, 240. In this manner, capacitor 238 is maintained charged through transistor 237 independently from the condition of main switch 204.

In operation, when main switch 204 is closed, transistor 244 is turned on, thereby turning transistor 237 off. As a consequence, transistor 243 is turned on and remains on during a time interval which is determined by the values of capacitor 238 and resistors 239, 240, with a reset pulse from its collector being fed to the other input of NAND circuit 212 is logic circuit 601, thereby resetting the latter to its initial condition.

Switching circuit 604 permits a selection between a limiter activated photographing mode, an automatic photographing mode in which the exposure is controlled solely by the electrical shutter circuit in the usual manner, and a manual photographing mode in which the exposure factors are determined by a manual operation. At this end, it includes mode selecting changeover switch 245A. This switch is ganged with mode selecting changeover switch 245B which is contained in the shutter control circuit 606 to be described later. Switch 245A includes a movable contact which can be selectively thrown into engagement with fixed contact 245Aa which is effective to couple limiter circuit 602 with shutter control circuit 606 to establish a limiter activated photographing mode, with fixed contact 245Ab which activates only shutter control circuit 606 to establish an automatic photographing mode, or with fixed contact 245Ac which establishes a manual photographing mode by operating shutter control circuit 606 in accordance with exposure factors which are manually established, by disconnecting photoelectric element 203 which is responsive to natural light, flashlight illumination or light emitted by element 234, from the shutter circuit.

Switching circuit 604 includes three series circuits connected across the pair of buses EO1, EO2, first one including PNP transistor 246, resistor 247 and NPN transistor 248, second one including resistor 249 and NPN transistor 250, and third one including resistor 251 and NPN transistor 252. Fixed contact 245Aa is connected with bus EO1 while fixed contact 245Ac is connected with bus EO2. In addition, it includes NPN transistors 253, 254 and resistors 255, 256, 257.

Specifically, resistor 255 has its one end connected with bus EO1 and its other end connected with the base of transistor 253, the emitter of which is connected with the output of NAND circuit 216 and the collector of which is connected with the base of transistor 248. Transistor 248 has its emitter connected with bus EO2 and its collector connected with the base of transistor 254, which has its emitter connected with bus EO2 and its collector connected with the base of transistor 233. A series circuit including resistors 256, 257 is connected between the base of transistor 246 and the base of transistor 250, with the junction between these resistors being connected with the movable contact of switch 245A. It will be noted that fixed contact 245Ab is left without circuit connection. The collector of transistor 250 is connected with the base of transistor 252, the collector of which is connected with the emitter of transistor 210 contained in logic circuit 601.

The operation of switching circuit 604 will be described below in accordance with a selected position of changeover switch 245A.

(i) Limiter activated photographing mode by throwing switch 245A to fixed contact 245A*a*

The emitter-to-base path of transistor 246 is short-circuited through resistor 256 and switch 245A, and thus becomes cut-off, leaving the base of transistor 254 without connection independently from the condition of transistor 248. Hence the collector output from transistor 254 is off, so that transistor 233 in shutter control circuit 606 is controlled solely by the time constant circuit of limiter circuit 602 which has a time constant on the order of 60 ms. When such time length passes after the initiation of an exposure, the emission of light from element 234 impinges on photometric element 203 to cause a forced shutter closing operation.

(ii) Automatic photographing mode by throwing switch 245A to fixed contact 245A*b*

In this instance, the base of transistor 246 is connected with the base of transistor 250 through resistors 256, 257, and hence is turned on. Transistor 254 is off and on when transistor 248 is on and off, respectively.

(iii) Manual photographing mode by throwing switch 245A to fixed contact 245A*c*

Transistor 254 operates in the same manner as mentioned in the previous paragraph (ii), but because mode selecting changeover switch 245B is thrown to manual contact 245B*c*, photometric element 203 is disconnected, and a fixed resistor is connected instead, so that there is not interaction between elements 234 and 203. Consequently, shutter control circuit 66 is not influenced by the various circuits 601, 602, 603 and 605, but only responds to a manually established exposure period.

In this manner, switching circuit 604 forms a control circuit providing an output from a transistor 254 which depends on the condition of transistor 248, this output controlling the conduction or non-conduction of or transistor 233 contained in shutter control circuit 606.

The purpose of gate circuit 605 is to prevent resistors contained in the electrical circuit of the electronic flash from being connected as a load across the output of shutter control circuit 606 when the electronic flash is mounted on the camera but is not activated, thus allowing the camera to operate alone. Since the camera here disclosed is a single lens reflex camera having an electrical shutter of non-memory TTL (through the lens) photometry type, an illumination produced by the electronic flash is determined by photometric element 203 disposed within the camera, and when it is determined that a proper exposure is reached, shutter control circuit 606 is activated to deenergize shutter closing electromagnet Mg, thus closing the shutter. Simultaneously, the same control signal is fed to the illumination control circuit 503 of the electronic flash through connection terminal TO, thereby interrupting the flashlight illumination thereof.

The control signal which is obtained as a result of TTL photometry is derived from the output of comparator 258 which is located at the end of shutter control circuit 606. This output is also connected with resistor 259 having a high resistance which is connected to operate switching transistor 260, which in turn controls the energization of shutter closing electromagnet Mg. The presence of this high value resistor 259 causes a degree of instability in the exposure period during the high speed shutter operation. When resistors contained in the electrical circuit of the electronic flash are connected with the output of comparator 258 as the electronic flash is mounted on the camera, an increased instability is caused in the exposure period during the shutter speed shutter operation even though there is no problem whatsoever for an increased length of exposure period which utilizes a synchronized flashlight illumination from the electronic flash.

To overcome this difficulty, an arrangement is made in accordance with the invention to prevent the resistors contained in the electrical circuit of the electronic flash from loading the output of shutter control circuit 606 when the camera is to be used alone even though the electronic flash is mounted thereon, by providing gate circuit 605. Stated differently, only when a synchronized photographing takes place by using the combination of the camera and the electronic flash, a control signal which results from TTL photometry in the camera is fed to illumination control circuit 503 of the electronic flash through gate circuit 605, thereby controlling the termination of the flashlight illumination thereof.

Specifically, gate circuit 605 comprises a series circuit including PNP transistor 261, resistor 262 and NPN transistor 263, another series circuit including PNP transistor 264, resistor 265 and NPN transistor 266, a further series circuit including PNP transistor 267 and NPN transistor 268, a fourth series circuit including PNP transistor 269, resistor 270 and NPN transistor 271, all connected across buses EO1, EO2. NPN transistor 271 has its collector connected through resistor 270 with the collector of transistor 269, its base connected with the junction between the collectors of transistors 267, 268, and its emitter directly connected with bus EO2. Another NPN transistor 272 has its collector connected with the base of transistor 263, its base connected through resistor 276 with bus EO1 and its emitter connected with the output of NAND gate 213. Additionally, NPN transistor 273 has its collector connected through resistor 277 with the base of transistor 269, and its emitter connected with bus EO2. The base of transistor 273 is connected with one collector of multi-collector transistor 274 which has its other collector connected with the base of transistor 268, its base connected with the collector of transistor 264 and its emitter connected with the collector of PNP transistor 275. The emitters of NPN transistors 261, 264, 275, 267 and 269 are connected with bus EO1, and their bases are connected in common with one end of resistor 262, to which the collector of transistor 261 is also connected. The other end of resistor 262 is connected with the collector of transistor 263, which has its emitter connected with bus EO2. Transistor 266 has its collector connected through resistor 265 with the collector of transistor 264, its emitter connected with bus EO2 and its base connected with the output of comparator 258 in shutter control circuit 606. The collector of transistor 268 is connected with the base of transistor 271 and also connected with the collector of transistor 267. The collector of transistor 269 is connected through resistor 292 with connection terminal TO.

Considering now shutter control circuit 606, it will be seen that it comprises mode selecting changeover switch 245B which is ganged with photographing mode selecting, changeover switch 245A, light emitting element 234, photometric, light receiving element 203 and NPN transistor 233. Specifically, it includes a series combination of resistors 278, 279, 280 connected across buses EO1, EO2, with the junction between resistor 279, 280 connected with one end of a string of fixed resistors 282 to 286. Selection switch 281, which is used to establish an exposure period manually, includes a number of fixed contacts which are connected with the other end of the string and also with the junctions between adjacent resistors thereof and over which its movable contact may be switched. By operating switch 281 to change the value of resistors which are connected in circuit therewith, an exposure period can be manually established. The movable contact of selection switch 281 is connected with fixed contact 245Bc of changeover switch 245B, which also includes fixed contacts 245Ba and 245Bb, which are interconnected and connected with one end of photometric element 203. Photometric element 203 may comprise any light responsive element having a rapid response such as silicon blue cell, for example. The other end of element 203 is connected with the junction between resistors 278, 279 and also with one input of operational amplifier 287. Light emitting element 234 is disposed adjacent to element 203 and comprises a light emitting diode. This diode is connected in series with resistor 288 between bus EO1 and the collector of transistor 233. Transistor 233 has its base connected with the collector of transistor 254 contained in mode selecting circuit 604, and its emitter connected with bus EO2.

Mode selecting changeover switch 245B may have its movable contact thrown into engagement with fixed contact 245Ba to establish a limiter activated photographing mode in which limiter circuit 602 cooperates with shutter control circuit 606. When the movable contact is thrown into engagement with fixed contact 245Bb, an automatic photographing mode is established in which shutter control circuit 606 operates alone. When switch 245B is thrown to fixed contact 245Bc, photometric element 203 is disconnected from the shutter circuit, and instead fixed resistors 282 to 286 are selectively connected with switch 245B through selection switch 281 for connection with the other input of operational amplifier 287, thus establishing a manual photographing mode.

Operational amplifier 287 with integrating capacitor 289 and trigger switch 290 connected in shunt across its output and its other input, comparator 258, switching transistor 260 and electromagnet Mg constitute together an electrical shutter circuit of a known form, The output of amplifier 287 feeds one input to comparator 258, which receives its other input from reference voltage circuit 607 which supplies a reference voltage. The reference voltage supplied by circuit 607 is varied by variable resistor 291 which is set according to input information such as film speed. Comparator 258 compares the voltage developed across capacitor 289 against the reference voltage, and produces an output whenever the charged voltage exceeds the latter. This output is applied to the base of transistor 266 in gate circuit 605 and also to the base of switching transistor 260 through resistor 259 having a high resistance. When switching transistor 260 is rendered non-conductive, electromagnet Mg is deenergized, closing the shutter.

The operation of the electrical circuit of the camera will now be described for different modes of operation.

(1) When changeover switches 245A, 245B are thrown to fixed contacts 245Aa, 245Ba, respectively, to establish a limiter activated photographing mode, with the electronic flash being disconnected:

In this instance, the shutter of the camera is closed in response to a limiter signal from limiter circuit 602 even though the exposure of an object being photographed is insufficient. The resulting exposure period is short enough to prevent a camera shake. When main switch 204 is closed as a result of the depression of a shutter button of the camera, transistor 244 in reset circuit 603 is turned on while transistor 237 is turned off. As a consequence, the charge stored on capacitor 238 which is maintained connected with power supply EO causes transistor 243 to be turned on for a time interval on the order of 1 ms, for example, which is determined by the values of capacitor 238 and resistors 239, 240, thus supplying a reset pulse to NAND circuits 212, 215 in logic circuit 601 for a time interval of 1 ms, starting with the closure of main switch 204.

Similarly, transistor 230 in limiter circuit 602 is turned on while transistor 220 is turned off. As a consequence, the charge stored on capacitor 221 causes transistor 218 to be turned on for a time interval of 60 ms, for example, which is determined by the values of capacitor 221, and resistors 224, 225. This turns transistors 232 and 231 off. After the time interval has passed, transistor 218 is turned off, and transistor 232 is turned on while transistor 231 is turned on, supplying a limiter signal to the base of transistor 233 in shutter control circuit 606.

The reset pulse has a lower potential than the ground potential, and hence can be considered as a binary 0 when the ground potential is represented as binary 1. In the description to follow, the ground potential is considered to represent binary 1 while a lower potential binary 0. In response to the reset pulse from reset circuit 603, one input of NAND circuit 212 receives "0", outputting "1" which is then fed back to one input of NAND circuit 213. Because the electronic flash is not mounted on the camera, there is no input signal from connection terminal LO, whereby transistor 206 remains off, inputting "1" to the other input of NAND circuit 213, which therefore produces "0" output. The flipflop circuit formed by the pair of NAND circuits 212, 213 is stabilized in this condition, supplying a negative input to the emitter of input transistor 272 of gate circuit 605, thereby turning this transistor on. Consequently, transistor 263 is turned off as are transistors 261, 264, 275 and 267. With the result that transistors 269, 271 are also turned off, producing no output at connection terminal TO.

At this time, inverter 217 produces "0" output, and hence NAND circuit 214 receives "0" and "1" inputs, producing "1" output. This "1" output from NAND circuit 214 together with "1" output from NAND circuit 215 which has received the reset pulse is fed to NAND circuit 216, causing it to produce "0" output. This output is fed to the emitter of transistor 253 in photographing mode switching circuit 604, and because the output potential is negative, this transistor is turned on, thereby turning transistor 248 off. Since switch 245A is thrown to fixed contact 245Aa, the emitter-to-base path of transistor 246 is short-circuited by resistor 256, and is rendered off. Thus, the base of transistor 254 is left without connection independently from the on and off condition of transistor 248, producing no signal at the collector thereof. Consequently, switching transistor 233 in shutter control circuit 606 is controlled by the limiter signal which is derived from limiter circuit 602.

Specifically, when the exposure of an object being photographed is insufficient, as determined by the amount of light incident on photometric element 203, and a time interval on the order of 60 ms passes since the closure of main switch 204 to produce a limiter signal, the latter signal turns transistor 233 on, whereby light emitting element 234 is activated to produce light. The light thus produced impinges on photometric element 203, whereby its photocurrent charges capacitor 289 until the voltage developed thereacross becomes equal to the reference voltage supplied from reference voltage circuit 607, whereupon comparator 258 ceases to produce its output, turning transistor 260 off to deenergize electromagnet Mg that has been holding the second shutter blind from running. In this manner, the second shutter blind is released for running, thus closing the shutter. It should be understood that when a proper exposure has been given to an object being photographed before the time interval of 60 ms has passed, the shutter is controlled in accordance with the timing at which the proper exposure has been reached.

In this manner, when the electronic flash is not mounted on the camera and a limiter activated photographing mode is established by using the changeover switches 245A, 245B, the shutter is automatically closed in an exposure period which is determined so as to avoid a camera shake even under an underexposure condition. This provides a better result if the proper exposure is not reached since the object being photographed has been subject to a certain degree of illumination and the resulting photograph is free from adverse influences of a camera shake.

(2) When changeover switches 245A, 245B are thrown to fixed contacts 245A$b$, 245B$b$ to establish an automatic photographing mode, with the electronic flash not connected therewith:

In this instance, the shutter of the camera remains open when an object being photographed is under an underexposure, the shutter remaining open until a proper exposure is reached unless the user manually closes the shutter. The principal difference over the limiter activated operation mentioned in previous paragraph (1) is the fact that changeover switch 245A is thrown to fixed contact 245A$b$, whereby the base of transistor 246 is connected with the base of transistor 250 through resistors 256, 257, thus turning transistor 246 on. Because transistor 248 is off, transistor 254 is turned on, which in turn maintains switching transistor 233 off independently from an output from limiter circuit 602, so that light emitting element 234 produces no light output. As a result, the shutter remains open until the amount of light received by photometric element 203 reaches a given value under natural illumination, whereupon shutter control circuit 606 is operated to close the shutter. It is also possible to close the shutter forcibly by an external operation by the user of the camera before the proper exposure is reached. However, a mechanism associated with such operation is known and hence will not be described herein.

(3) When changeover switches 245A, 245B are thrown to fixed contacts 245A$c$, 245B$c$, respectively, to establish a manual photographing mode, without the connection of the electronic flash:

In this instance, the shutter is closed in accordance with a manually established exposure period which is chosen by a setting on selection switch 281, independently from the amount of exposure upon an object being photographed. The primary difference over the operations mentioned under paragraphs (1) and (2) is the fact that selection switch 245B is thrown to fixed contact 245B$c$, which prevents an operation of photometric element 203 since its end is not connected with the circuit. Consequently, the closure of the shutter takes place independently from the amount of exposure upon an object being photographed.

Fixed contact 245B$c$ is connected with the movable contact of selection switch 281, which is manually preset to one of fixed contacts thereof which are connected with the junctions between fixed resistors 282 to 286. Thus, the value of capacitor 289 and the sum of resistance of these resistors which are connected in series therewith causes operational amplifier 287 to determine an exposure period. When such period passes, comparator 258 ceases to produce its output, whereby the shutter is closed.

Since selection switch 245A is thrown to fixed contact 245A$c$ at this time, the base of transistor 246 is connected with bus EO2 through resistor 256, whereby it is turned on. This in turn causes transistor 248 to be turned off and transistor 254 to be turned on, maintaining switching transistor 233 off independently from an output from limiter circuit 602 to prevent element 234 from producing light output.

The base-to-emitter path of transistor 250 is short-circuited, and hence this transistor is turned off while transistor 252 is turned on. Accordingly, "1" is fed to one input of NAND circuit 213, which produces "0" output, turning transistor 272 on and transistor 263 off in gate circuit 605, with result that transistors 269, 271 are turned off, producing no output at connection terminal TO.

(4) When the electronic flash is mounted on the camera and selection switches 245A, 245B are thrown to fixed contacts 245A$a$, 245B$a$, respectively, to establish a limiter activated photographing mode:

In this instance, the flashlight illumination from the electronic flash is controlled by the photometric operation of element 203 disposed within the camera, and in the event of an underexposure, the shutter is responsive to a limiter signal from limiter circuit 602 by being closed within a preset time interval which is chosen to prevent a camera shake.

When power switch 2 of the electronic flash is thrown to fixed contact 2$b$ to connect power supply E with the circuit, DC-DC converter is set in oscillation to feed, through rectifier diode 14, flashlight illumination circuit 502, illumination control circuit 503 and display circuit 504. As main capacitor 18 begins to be charged, a signal is produced at connection terminal L which is of a very low level and of a polarity to flow out of this terminal. However, at this stage, the currect flow through light emitting element 201 provided on the part of camera is of a level which is insufficient to permit a recognition of the illumination thereof. Transistor 211 then detects a signal of such low level, and can be turned on simultaneously with the closure of main switch 204 located within the camera. This is advantageous to enable a limiter activated photographing operation in the event the shutter is opened before the capacitor is completely charged. Subsequently, when the charging of main capacitor 18 is completed, display element 28 is illuminated, and its current flow is fed to the base of transistor 42 through diode 41, thus turning this transistor on. In this manner, a sufficient current flow is supplied through display element 201 located within the finder of the camera to illuminate it with a sufficient brightness to recognize its illumination, and hence the completion of a charging operation.

When main switch 204 is closed in synchronism with a shutter release operation, transistor 211 is turned on, and causes transistor 206 to be forwardly biased into conduction through the base-to-collector path of transistor 210, thus feeding "0" input to NAND circuit 213.

At the instant when main switch 204 is closed in synchronism with a shutter release operation, transistor 243 in reset circuit 603 is turned on for a time interval determined by capacitor 238 and resistors 239, 244 to supply a reset pulse to NAND circuits 212 and 215 in logic circuit 601, generally in the same manner as mentioned above under paragraph (1). Simultaneously, transistor 218 in limiter circuit 602 is turned on for a time interval determined by capacitor 221 and resistors 244, 225, thereby supplying a limiter signal to transistor 233 of shutter control circuit 606 through transistors 232, 231.

In logic circuit 601, NAND circuit 213 produces "1" output in response to a reset pulse from reset circuit 603 and "0" input produced as transistor 206 is turned on. NAND circuit 214 produces "1" output in response to "0" output from inverter 217 and "0" input produces as transistor 206 is turned on. Both of these outputs causes NAND circuit 216 to produce "0" output. "1" output from NAND circuit 213 permits a base current to be supplied to transistor 263 in gate circuit 605 through resistor 276 and the base-to-collector path of transistor 272, thus turning transistor 263 on. This turns transistors 261, 264, 275, 267 on. Since the base of transistor 266 is connected with the output of comparator 258 in shutter control circuit 606 which is turned on simultaneously with the closure of the main switch 204, transistor 266 is turned on, causing transistor 269 to be turned on and transistor 271 to be turned off.

After the closure of main switch 204, when a shutter release operation of the camera takes place to close synchro switch 202 in synchronized relationship, the connection of power switch 2 with fixed contact 2b short-circuits the charged capacitor 29 in flashlight illumination circuit 502 through a path including diode 25, connection terminal X of the electronic flash, collection terminal XO of the camera, synchro switch 202, connection terminal GO of the camera, connection terminal G of the electronic flash, resistor 37 and the parallel combination of the gate-to-cathode path of SCR 35 and resistor 36, thus firing the trigger switch SCR 35. Thereupon trigger capacitor 44 is short-circuited, whereby the charge stored thereon is applied across primary coil 45a of trigger transformer 45, developing a high voltage pulse across secondary coil 45b. This high voltage is applied to trigger electrode 62a of flash discharge tube 62. At the same time, when SCR 35 is fired, trigger capacitor 43 is short-circuited through a path including the parallel combination of the anode-to-cathode path of SCR 35 and its gate and resistor 36, resistor 50, diode 53 and the parallel combination of capacitor 60, resistor 61 and the gate-to-cathode path of SCR 63, thereby firing SCR 63 to enable a flashlight illumination from discharge tube 62.

The flashlight illumination emitted by discharge tube 62 is reflected by an object being photographed and impinges on photometric element 203 disposed within the camera. Photocurrent flow through element 203 charges capacitor 289 since trigger switch 290 is opened in synchronism with a shutter release operation. The integrated voltage developed at the output of operational amplifier 287 is applied to comparator 258 for comparison with a reference voltage supplied by reference voltage circuit 607 in accordance with a setting on variable resistor 291. When the integrated voltage exceeds the reference voltage, comparator 258 ceases to produce an output, thereby turning transistor 260 off to deenergize electromagnet Mg, whereby the latter releases the second shutter blind for running. In this manner, the shutter is closed. At this time, since the output of comparator 258 is connected with the base of transistor 266 in gate circuit 605, transistor 266 is turned off, which in turn causes transistor 269 to be turned off and transistor 271 to be turned on, supplying an illuminated control signal to the electronic flash through connection terminal TO.

In the event of an insufficient exposure, or when the amount of light impinging on photometric element 203 does not reach a given value, a limiter signal from limiter circuit 602 turns transistor 233 on after the given time interval, thus causing element 234 to emit light. The light thus emitted impinges on photometric element 203 to compensate for the difference between the proper exposure and the insufficient exposure. This compensation causes comparator 258 to cease to produce its output, deenergizing electromagnet Mg and closing the shutter. In addition, transistor 269 is turned off while transistor 271 is turned on, supplying an illumination control signal through connection terminal TO.

The illumination control signal supplied to connection terminal TO is fed through connection terminal T on the electronic flash to the base of transistor 88 contained in illumination control circuit 503, thereby turning it on. Then the trigger switch or SCR 79 is fired, whereby trigger capacitor 77 is short-circuited through primary coil 76a of trigger transformer 76, developing a high voltage pulse across its secondary coil 76b. This voltage is applied to trigger electrode 75a of auxiliary discharge tube 75 to fire it. Thereupon the anode of SCR 63 is driven to a negative potential, and hence SCR 63 is rendered non-conductive, interrupting the illumination from flash discharge tube 62. Capacitor 66 which has been charged by the firing of auxiliary discharge tube 75 causes display element 69 to flash, and the flashing current turns transistor 42 on and off repeatedly, thereby transmitting a signal through connection terminal L which causes a flashing operation of light emitting element 201 disposed within the camera to indicate the completion of a flashlight illumination.

At this time, reflective light from an object being photographed also impinges on light receiving element 92 disposed within the electronic flash, and the resulting photocurrent causes transistor 104 to be turned on when the amount of light reaches a given value. By choosing a resistance on the order of 10 kΩ for resistor 93 and a resistance of 1 kΩ for resistor 292 connected with connection terminal TO on the camera, the potential at the junction between resistor 94 and the collector of transistor 104 is insufficient to turn transistor 88 on. Specifically, assuming that the voltage developed at the junction between resistor 94 and the collector of transistor 104 has a value of −10 volts, for example, the closed loop including resistor 94, connection terminals G, GO, the emitter-to-collector path of transistor 269, resistor 292, connection terminals TO, T, diode 91 and resistor 93 reduces the voltage developed at connection terminal T to a value less than −1 volt, which is insufficient to turn transistor 88 on.

It will thus be seen that when the electronic flash is mounted on camera and photographing mode selecting, changeover switches 245A, 245B are operated to establish a limiter activated photographing mode, the flashlight illumination is controlled by photometric element 203 which is disposed within the camera, and the shutter will be automatically closed under an underexposure condition in a period of time which prevents a camera shake from occurring. In this manner, a photograph can be obtained though it is of less than satisfactory quality.

(5) When changeover switches 245A, 245B are thrown to fixed contacts 245A*b*, 245B*b*, respectively, to establish an automatic photographing mode, with the electronic flash connected with the camera:

In this instance, the flashlight illumination from the electronic flash is controlled by photometric element 203 disposed within the camera, and the shutter is closed in response to a limiter signal from limiter circuit 602 when the exposure of an object being photographed is insufficient. The principal difference over the mode of operation mentioned under paragraph (4) is the fact that changeover switch 245A is thrown to engage fixed contact 245A*b*, so that the base of transistor 246 is connected through resistors 256, 257 with the base of transistor 250, and hence transistor 246 is turned on. This turns transistor 248 off, and hence transistor 254 is turned on. Since the emitter-to-base path of transistor 233 is short-circuited by transistor 254, switching transistor 233 is maintained off.

When the electronic flash has produced its flashlight illumination and a given amount of reflective light from an object being photographed is received by photometric element 203, shutter control circuit 606 is activated to close the shutter. Because comparator 258 ceases to produce an output, an illumination control signal is supplied to connection terminal TO. In the event a normal illumination control signal is not obtained from shutter control circuit 606 because of the insufficient exposure though flashlight illumination has been given, the discharge of flash discharge tube 62 in the electronic flash turns transistor 33 on, so that a signal indicative of the illumination is supplied through connection terminals L, LO to light emitting element 201, thus temporarily short-circuiting the path across terminals LO, GO. This turns transistors 211 and 206 off, supplying "1" input to NAND circuit 213. The output of NAND circuit 213 remains "1" in response thereto, but the output of NAND circuit 214 changes to "0" and that of NAND circuit 216 changes to "1", with consequence that transistor 254 in photographing mode switching circuit 604 is turned off. This permits switching transistor 233 in shutter control circuit 606 to be turned on in response to a limiter signal from limiter circuit 602, causing an illumination of element 234 which impinges on element 203. When the amount of light input to element 203 reaches a given value, shutter control circuit 606 is activated to close the shutter, producing an illumination control signal at connection terminal TO. Again a photograph can be taken though it may be of less than satisfactory quality, in the event of an underexposure.

(6) When changeover switches 245A, 245B are thrown to fixed contacts 245A*c*, 245B*c*, respectively, to establish a manual photographing mode, with the electronic flash connected:

In this instance, the flashlight illumination is controlled by photometric element 92 which is disposed within the electronic flash, and the shutter is closed in accordance with an exposure period which is previously established by selection switch 281, independently of the amount of exposure. The major difference over the mode of operation mentioned under paragraph (4) is the fact that changeover switch 245B is thrown to fixed contact 245B*c*, so that photometric element 203 disposed within the camera is disconnected from the circuit and hence is inoperative. As a consequence, the amount of exposure upon an object being photographed has nothing to do with the closure of the shutter. Because switch 245B is thrown to fixed contact 245B*c*, capacitor 289 is connected in series with selected resistors which are connected with the movable contact of selection switch 281. In this manner, operational amplifier 287 calculates an exposure period, at the end of which comparator 258 ceases to produce its output, whereupon electromagnet Mg is deenergize to permit the shutter to be closed.

On the other hand, selection switch 245A is thrown to fixed contact 245A*c*, so that the emitter-to-base path of transistor 250 is short-circuited, and hence it is turned off while transistor 252 is turned on. Consequently, transistor 206 is turned off independently from a signal fed through connection terminal LO, so that NAND circuit 213 produces "0" output, turning transistor 272 on and transistor 263 off. This results in both transistors 269, 271 being turned off, which means that connection terminal TO is electrically disconnected. Hence, when comparator 258 ceases to produce its output, an illumination control signal is not transmitted to the electronic flash. In addition, connection terminal T of the electronic flash is electrically disconnected from the camera, so that light receiving element 92 provided in the electronic flash becomes operative to permit the voltage, on the order of −10 volts, developed at the junction between resistor 94 and the collector of transistor 104 in response to the turning on of transistor 104, to be directly applied to the base of transistor 88 to thereby turn it on for firing auxiliary discharge tube 75 to interrupt the flashlight illumination from flash discharge tube 62, inasmuch as the closed loop mentioned above in connection with paragraph (4) is not formed.

In this manner, in a manual photographing mode with the electronic flash mounted on the camera, photomeric element 92 is effective to control the flashlight illumination from the electronic flash, and the shutter of the camera is closed in accordance with an exposure period preset by means of selection switch 281, independently from the amount of exposure upon an object being photographed.

What is claimed is:

1. A camera with an electrical shutter adapted to be used with an electronic flash unit including a flash discharge tube; said camera comprising:
 a photometric circuit including a light receiving element which adapted to effect through-the-lens photometry;
 a shutter;
 an electrical shutter control circuit which is responsive to an output of the photometric circuit for normally closing said shutter;
 auxiliary shutter closing means for receiving a first electrical signal supplied by the electronic flash unit in response to occurrence of the flashlight illumination of the flash discharge tube;
 said auxiliary shutter closing means including timer circuit means for sensing a shutter release operation and in response thereto for producing a second signal after a predetermined time period when the amount of light received by said photometric circuit during a flash photography operation is insufficient; and
 said auxiliary shutter closing means being responsive to said first and second signals to operate said shutter control circuit through the photometric circuit to close said shutter.

2. A camera according to claim 1 in which said auxiliary shutter closing means comprises a logic circuit for storing said first electrical signal supplied by said electronic flash unit, said timer circuit means including a timer pulse generator for supplying a reset pulse to said logic circuit upon the shutter release operation, a switching transistor which is turned on by said second signal and said first electrical signal which has been stored in said logic circuit, and a light emitting element which is operative to emit light when said transistor is turned on to supply light input to said light receiving element of said photometric circuit, thereby operating the photometric circuit.

3. A camera according to claim 2 in which the timer pulse generator comprises a reset circuit for producing a reset pulse, and a limiter circuit for producing said second signal.

4. A camera according to claim 3 in which both the reset circuit and the limiter circuit comprise resistor-capacitor timer circuits.

5. A camera according to claim 2 in which the logic circuit comprises a pair of flip flops together comprising four NAND circuits, and another NAND circuit and an inverter which couple the pair of flipflops together.

6. A camera according to claim 1, further comprising said electronic flash, in which the electronic flash unit comprises a connection terminal to which an illumination signal is applied for transmission to the camera, the illumination signal indicating the occurence of a flashlight illumination from the flash discharge tube.

7. A camera and an electronic flash unit, said camera comprising:
a shutter;
first means for detecting flashlight illumination reflected by a subject to be photographed, and auxiliary shutter closing means for enabling the closing of said shutter after a selected length of time when said reflected light is below a selected value for said selected length of time;
said electronic flash unit providing a control signal to said auxiliary shutter closing means upon the occurrence of flashlight illumination; and
said auxiliary shutter closing means including timer circuit means and being connected to said shutter for closing said shutter in response to said control signal and the output of said timer circuit means, said timer circuit means being responsive to the closure of a power switch of the camera in response to a shutter release operation for producing said output after said selected length of time.

8. A camera as claimed in claim 7, wherein said electronic flash unit has terminal means for providing said control signal.

9. A camera as claimed in claim 7, wherein said first means comprises a photocell.

10. A camera as claimed in claim 9, wherein said auxiliary shutter closing means comprises a light emitting element optically coupled to said photocell.

11. A camera as claimed in claim 7, wherein said auxiliary shutter closing means comprises a light emitting element.

12. A photographic apparatus including a camera with an electrical shutter and an electronic flash unit with a flash discharge tube for use with said camera, said apparatus comprising:

a photometric circuit comprising a photocell adapted to receive light reflected by a subject to be photographed;
an electrical shutter having the timing of the start of its closing operation controlled by an electromagnet;
an electrical shutter control circuit of the nonmemory type responsive to an output of said photometric circuit for normally closing said shutter;
a voltage detection circuit including a signal producing capacitor connected to a discharge path of said flash discharge tube for detecting a change of voltage of said discharge path which occurs when said flash discharge tube is discharged and for producing a first signal in response to detecting said change of voltage;
auxiliary shutter closing means including timer circuit means for sensing a shutter release operation and in response thereto for producing a second signal after a predetermined time; and
said auxiliary shutter closing means being operative when both said voltage detection circuit and said timer circuit means produce said first and second signals to forcibly close said shutter when its closing operation is not initiated within the period of said predetermined time after the initiation of said flashlight illumination.

13. A camera in combination with an electronic flash unit, said camera comprising:
a photometric circuit comprising a photocell adapted to receive light coming from a subject to be photographed;
an electrical shutter;
an electrical shutter control circuit responsive to an output of said photometric circuit for normally closing said shutter;
auxiliary shutter closing means including timer circuit means for sensing a shutter release operation and in response thereto for producing a first signal after a predetermined time;
first terminal means connected to said auxiliary shutter closing means for receiving a second signal from said electronic flash unit indicative of an occurrence of a flash illumination; and
said auxiliary shutter closing means being operative in response to said first and second signals to forcibly close said shutter when said shutter closing operation is not initiated within the period of said predetermined time;
said electronic flash unit comprising:
a flash discharge tube;
a trigger circuit for discharging said flash discharge tube;
a voltage detection circuit including a signal producing capacitor connected to a discharge path of said flash discharge tube for detecting a change of voltage of said discharge path which occurs when said flash discharge tube is discharged and for producing said second signal upon detecting said change of voltage; and
second terminal means connected to said voltage detection circuit and adapted to be connected to said first terminal means for applying said second signal to said auxiliary shutter closing means to close said shutter.

14. An electronic flash unit for use with a camera, wherein said camera includes a first terminal for receiving a first signal from said electronic flash unit, a shutter, and auxiliary shutter closing means to close said shutter, said electronic flash unit comprising:
- a flash discharge tube;
- a trigger circuit and a main capacitor both for discharging said flash discharge tube;
- a voltage detection circuit including a coil and a diode interposed within a discharge path for discharging the charge of said main capacitor to said flash discharge tube, a signal producing capacitor connected in parallel to said flash discharge tube, a transistor connected to said discharge path which is activated by the discharge of said signal producing capacitor when said flash discharge tube is discharged, said voltage detection circuit detecting a change of voltage of said discharge path which occurs when said flash discharge tube is discharged and producing said first signal via said transistor in response to detecting said change of voltage; and
- a second terminal in said electronic flash unit for receiving said first signal from said transistor when activated and adapted to be connected to said first terminal of said camera, said second terminal applying said first signal via said first terminal to said auxiliary shutter closing means of said camera to close said shutter;
- a shutter;
- first means for detecting flashlight illumination reflected by a subject to be photographed, and auxiliary shutter closing means for enabling the closing of said shutter after a selected length of time when said reflected light is below a selected value for said selected length of time;
- said electronic flash unit providing a control signal to said auxiliary shutter closing means upon the occurrence of flashlight illumination; and
- said auxiliary shutter closing means including timer circuit means and being connected to said shutter for closing said shutter in response to said control signal and the output of said timer circuit means, said timer circuit means being responsive to the closure of a power switch of the camera in response to a shutter release operation for producing said output after said selected length of time.

15. An electronic flash unit in combination with a camera, the camera comprising:
- a photometric circuit comprising a photocell adapted to receive light coming from a subject to be photographed;
- an electrical shutter;
- an electronic shutter control circuit responsive to an output of said photometric circuit for normally closing said shutter;
- auxiliary shutter closing means including timer circuit means for sensing a shutter release operation and in response thereto for producing a first signal after a predetermined time;
- first terminal means connected to said auxiliary shutter closing means for receiving a second signal from said electronic flash unit indicative of an occurrence of a flash illumination; and
- auxiliary shutter closing means being energized to ignition in response to said first and second signals to illuminate said photocell thereby to forcibly close said shutter when said shutter closing operation is not initiated within the period of said predetermined time;

said electronic flash unit comprising:
- a flash discharge tube;
- a trigger circuit for discharging said flash discharge tube;
- a voltage detection circuit including a signal producing capacitor connected to a discharge path of said flash discharge tube for detecting a change of voltage of said discharge path which occurs when said flash discharge tube is discharged and for producing said second signal upon detecting said change of voltage; and
- second terminal means connected to said voltage detection circuit and adapted to be connected to said first terminal means for applying said second signal to said auxiliary shutter closing means to close said shutter.

* * * * *

UNITED STATES PATENT AND TRADEMARK OFFICE
CERTIFICATE OF CORRECTION

PATENT NO. : 4,457,601

DATED : July 3, 1984

INVENTOR(S) : Isao Kondo and Yukio Nakajima

It is certified that error appears in the above-identified patent and that said Letters Patent is hereby corrected as shown below:

In the Specification:

Column 4, line 57, change "(F)" to --(J)--.

Column 6, line 51 change "402" to --502--.

Column 7, line 26 change "19" to --10--,

Column 12, line 41 change "204" to --205--.

Column 12, line 50 change "the" to --The--.

Column 14, line 12 change "is" to --in--.

Column 16, line 66 change "resistor" to --resistors--.

Column 22, line 8 change "illuminated" to -- illumination --.

UNITED STATES PATENT AND TRADEMARK OFFICE
CERTIFICATE OF CORRECTION

PATENT NO. : 4,457,601

DATED : July 3, 1984

INVENTOR(S) : Isao Kondo and Yukio Nakajima

It is certified that error appears in the above-identified patent and that said Letters Patent is hereby corrected as shown below:

In the Claims:

Claim 1, column 24, line 50 before "adapted" insert --is--.

Claim 14, columns 27 and 28, cancel lines 27 to 42 in column 27 and lines 1 and 2 in column 28.

column 27, line 26 change ";" to --.--.

*Signed and Sealed this*

*Twelfth* Day of *March 1985*

[SEAL]

*Attest:*

DONALD J. QUIGG

*Attesting Officer*     *Acting Commissioner of Patents and Trademarks*